UNITED STATES PATENT OFFICE.

WALTER D. FIELD, OF SHORT HILLS, NEW JERSEY.

PYROXYLINE VARNISH.

SPECIFICATION forming part of Letters Patent No. 381,354, dated April 17, 1888.

Application filed August 13, 1887. Serial No. 246,864. (No specimens.)

*To all whom it may concern:*

Be it known that I, WALTER D. FIELD, a citizen of the United States, residing at Short Hills, in the county of Essex and State of New Jersey, have invented certain new and useful Improvements in the Manufacture of Pyroxyline Solutions or Compounds, of which the following specification is a full, clear, and exact description.

This invention has for its object more particularly the production of thin solutions of pyroxyline (otherwise known as soluble "nitrocellulose") which can be employed as lacquers or varnishes on metals and other materials; but it also relates to the manufacture of plastic pyroxyline or celluloid.

The invention consists in the utilization, in the manufacture of pyroxyline solutions or compounds, (including plastic pyroxyline as well as fluid solutions,) of a mixture of the acetic-acid derivatives of the lighter alcohols of fusel-oil as a solvent or converting agent for the pyroxyline; or, as a substitute for the mixture of these derivatives, of a solvent or converting agent generally composed of or containing in substantial proportion one or more of these derivatives, (and especially propyl and butyl acetates, which are acetic-acid derivatives of the principal lighter alcoholic constituents of fusel-oil,) irrespective of any special mode of preparing them or of the source whence derived.

The invention also consists in a varnish or lacquer composed of pyroxyline dissolved in a menstruum consisting of naphtha in conjunction with the aforesaid mixture of acetic-acid derivatives or their specified substitute. These acetic acid derivatives have special advantages in the manufacture of pyroxyline solutions for use as lacquers or varnishes, in that they are not only good solvents, but evaporate rapidly at ordinary temperatures, although not so rapidly as to prevent or render difficult the practical application of the same by brushing or dipping; that they are anhydrous and non-hygroscopic, or nearly so, and can be applied in the cold, and that they are miscible with benzine (petroleum naphtha) and with solvents generally of pyroxyline. They may be used alone to dissolve pyroxyline, or they may be mixed or compounded with other materials.

In order to form a thin solution adapted for application to metal surfaces, about two and a half to three pounds of dry pyroxyline—say nitro cotton—may be dissolved in, say, ten gallons of a suitable menstruum, composed in whole or in part of one or more of the above-named acetates; but it is preferred to use for the menstruum the mixture of the acetic-acid derivatives of the lighter alcohols of fusel-oil—to wit, those boiling at eighty-five to one hundred and twenty-five degrees centigrade, (85° to 125° C.) These alcohols are separated by fractional distillation from the heavier parts of the fusel-oil, which consist, principally, of amyl alcohol, and the distillate, after dehydration, with or without purification by further distillation, is converted into a mixture of the acetates of the alcohol radicles by treatment with sulphuric acid and acetic acid, or with sulphuric acid and a metallic acetate, or by other known or suitable chemical means for effecting the desired conversion.

In practice the fusel-oil is subjected to fractional distillation in a steam-heated still at a temperature of about one hundred and five degrees centigrade, (105° C.) The volatile portion or distillate contains substantially the liquids boiling between eighty-five (85° C.) and one hundred and twenty-five degrees, (125° C.,) and constitutes or may constitute about twenty-two to thirty per cent. (22% to 30%) of the fusel-oil. The principal alcohol constituents of the distillate are primary propyl and isobutyl alcohols; but it contains, also, certain isomers and homologues. It is mixed with common salt, (otherwise known as sodium chloride,) which is allowed to act for at least twelve hours (12 hrs.) in order to dehydrate it. The brine or solution of salt formed by the salt uniting with the water in the distillate settles at the bottom and the supernatant alcoholic liquid is drawn off. This liquid, being first heated to about seventy degrees centigrade, (70° C.,) is treated with sulphuric acid in the proportion of fourteen pounds (14 lbs.) of sulphuric acid of sixty-six degrees Baumé (66° B.) to twenty pounds (20 lbs.) of said liquid, and afterward acetic acid, eighty per cent. (80%) glacial, is added in the proportion of forty pounds (40 lbs.) to the quantities before stated. The sulphuric acid forms compounds with the alcohols which, on the addition of the acetic acid, are converted into acetates of propyl and butyl and their homologues. The mixture of acetates is subsequently neutralized by washing with alkaline water and dried over calcium chloride. It may be distilled; but it is preferred to effect any necessary purification in the preliminary or alcoholic stage. The mixture is now ready to be used as a solvent or converting agent by subjecting pyroxyline to its action in any ordinary or suitable way, as well understood by those accustomed to dissolve or convert pyroxyline. It may be used alone or in connection with other solvents or kindred substances.

In order to form plastic pyroxyline, the acetates may be used in or about the proportions in which liquid solvents or converting agents are commonly employed.

The new or improved pyroxyline solutions or compounds can also be employed as ingredients in mixtures or compositions of any kind when the other elements employed are not antagonistic. For example, a mixture of propyl and butyl acetates or the propyl or butyl acetates separately may be employed in connection with one or more volatile oils, benzine, (otherwise known as "petroleum naphtha,") benzene, (otherwise known as "coal naphtha,") spirits of turpentine, or other light hydrocarbons, or with one or more of the light solvents or partial solvents of pyroxyline—such as methyl alcohol, ethyl alcohol, acetone, ethyl ether, or with one or more of the alcohols and ethers having a higher boiling-point than ether alcohol, or with members of two or more of these classes.

The following is a formula containing members of two of these classes to form a thin solution for use as a varnish, namely: mixture of propyl and butyl acetates, prepared as above described, four gallons; benzine, (petroleum naphtha,) four gallons; methyl alcohol, two gallons; pyroxyline, two and one-half pounds.

A portion of the before-named mixture—say one gallon—could be replaced by a like quantity of amyl alcohol or acetate.

I do not claim herein any product, composition, process, or improvement outside of or apart from pyroxyline solutions or compounds and their manufacture; but I reserve all such matters herein described or suggested to a separate application or applications for patent.

I do claim herein as my invention or discovery—

1. The improvement in making pyroxyline solutions or compounds consisting in dissolving or converting the pyroxyline by subjecting it to the action of the aforesaid mixture of the acetic-acid derivatives of the lighter alcohols of fusel-oil or its specified substitute, substantially as described.

2. A pyroxyline solution or compound, especially a thin solution or lacquer, consisting of pyroxyline dissolved in or converted by the aforesaid mixture of the acetic-acid derivatives of the lighter alcohols of fusel-oil or its specified substitute, substantially as described.

3. The varnish or lacquer composed of pyroxyline dissolved in a menstruum, consisting of naphtha in conjunction with the aforesaid mixture of the acetic acid derivatives of the lighter alcohols of fusel-oil or its specified substitute, substantially as described.

In testimony whereof I have signed this specification in the presence of two witnesses.

WALTER D. FIELD.

Witnesses:
   J. E. HOWELL,
   EDWD. N. CRANE.